(12) United States Patent
Spanier et al.

(10) Patent No.: US 7,388,189 B2
(45) Date of Patent: Jun. 17, 2008

(54) SYSTEM AND METHOD FOR CONNECTING ELECTRICAL DEVICES USING FIBER OPTIC SERIAL COMMUNICATION

(75) Inventors: Joseph Spanier, Brooklyn, NY (US); Tibor Banhegyesi, Baldwin Harbor, NY (US)

(73) Assignee: Electro Industries/Gauge Tech, Westburg, NY (US)

( * ) Notice: Subject to any disclaimer, the term of this patent is extended or adjusted under 35 U.S.C. 154(b) by 133 days.

(21) Appl. No.: 11/042,588

(22) Filed: Jan. 24, 2005

(65) Prior Publication Data

US 2006/0086893 A1    Apr. 27, 2006

Related U.S. Application Data

(60) Provisional application No. 60/622,479, filed on Oct. 27, 2004.

(51) Int. Cl.
*G01J 1/04* (2006.01)
*G01J 1/42* (2006.01)
*G02F 1/00* (2006.01)
*H04B 10/08* (2006.01)
*H04B 10/00* (2006.01)

(52) U.S. Cl. .............. 250/227.12; 250/208.4; 398/3; 398/36; 398/110

(58) Field of Classification Search .......... 250/227, 250/227.11, 208.4, 227.12; 398/66, 67, 70, 398/71, 140, 141, 166, 173, 174, 175, 181, 398/3, 4, 5, 58, 59, 13, 20, 36, 38, 110, 112, 398/113, 116, 120, 123, 127; 385/5, 76

See application file for complete search history.

(56) References Cited

U.S. PATENT DOCUMENTS

| | | | | |
|---|---|---|---|---|
| 4,531,240 | A | * | 7/1985 | Yokomizo ...................... 398/4 |
| 5,210,632 | A | * | 5/1993 | Murakami et al. ............ 398/62 |
| 5,995,911 | A | | 11/1999 | Hart |
| 6,236,949 | B1 | | 5/2001 | Hart |
| 6,671,635 | B1 | | 12/2003 | Forth et al. |
| 6,694,270 | B2 | | 2/2004 | Hart |
| 6,751,562 | B1 | | 6/2004 | Blackett et al. |
| 6,798,191 | B1 | | 9/2004 | MacFarlane et al. |
| 6,825,776 | B2 | | 11/2004 | Lightbody et al. |
| 6,895,189 | B1 | * | 5/2005 | Bedrosian ................... 398/155 |
| 6,944,555 | B2 | | 9/2005 | Blackett et al. |
| 6,961,641 | B1 | | 11/2005 | Forth et al. |
| 6,988,025 | B2 | | 1/2006 | Ransom et al. |
| 6,990,395 | B2 | | 1/2006 | Ransom et al. |
| 7,085,824 | B2 | | 8/2006 | Forth et al. |
| 2003/0101008 | A1 | | 5/2003 | Hart |
| 2003/0105608 | A1 | | 6/2003 | Hart |
| 2003/0212512 | A1 | | 11/2003 | Hart |
| 2003/0220752 | A1 | | 11/2003 | Hart |

(Continued)

*Primary Examiner*—Georgia Y. Epps
*Assistant Examiner*—Don Williams
(74) *Attorney, Agent, or Firm*—Gerald E. Hespos; Anthony J. Casella; Michael J. Porco

(57) ABSTRACT

A system and method for communicating between serially connected electrical devices of a network is provided. The network includes a series of electrical devices, and fiber optic connectors between electrical devices of the series of electrical devices forming a closed communication ring in which output of each electrical device is communicatively connected to input of a subsequent electrical device of the series of electrical devices.

33 Claims, 4 Drawing Sheets

U.S. PATENT DOCUMENTS

| | | |
|---|---|---|
| 2004/0066311 A1 | 4/2004 | Giles et al. |
| 2004/0138787 A1 | 7/2004 | Ransom et al. |
| 2004/0138835 A1 | 7/2004 | Ransom et al. |
| 2004/0183522 A1 | 9/2004 | Gunn et al. |
| 2004/0229578 A1 | 11/2004 | Lightbody et al. |
| 2005/0017874 A1 | 1/2005 | Lightbody et al. |
| 2006/0230394 A1 | 10/2006 | Forth et al. |

* cited by examiner

SYSTEM AND METHOD FOR CONNECTING ELECTRICAL DEVICES USING FIBER OPTIC SERIAL COMMUNICATION

This application claims priority under 35 U.S.C. §119 to U.S. Provisional Application Ser. No. 60/622,479, filed on Oct. 27, 2004, and entitled "Fiber Optic Daisy Chain for Electrical Devices/Meters", the entire contents of which are expressly incorporated herein in their entirety.

BACKGROUND OF THE INVENTION

1. Field of the Invention

This invention relates to connecting electrical devices. In particular, this invention relates to a system and method for connecting electrical devices using a fiber optic serial communication configuration.

2. Description of the Related Art

In a master/slave configuration, digital communication is provided between a master device and a plurality of slave devices so that the master may communicate with individual slaves. One configuration is a serial communication (e.g., daisy chain) configuration in which an input channel or port of each device is connected to an output channel or port of an adjacent device, forming a closed ring, where one of the devices is a master device and the rest of the devices are slave devices. In a common configuration, the devices are connected using a network based on electrically based serial communication standards, such as RS485 hardware and software standards using a 4-wire or 2-wire communication system, where the devices are connected by an electrically conductive cable (e.g., a copper cable). Bi-directional communication may be provided over a pair of wires of the RS485 hardware. However, the RS485 is limited in accordance with speed constraints inherent to propagation speeds along electrically conductive cable (e.g., copper cable). Additionally, the electrically conductive cable is inherently susceptible to noise, poor grounding, power surges and attenuation of propagated signals towards the end of the chain, which may disrupt communication and/or cause damage to one or more devices of the network.

One application for a master/slave configuration using a serial communication configuration is linking of slave meters, such as water, voltage, current and/or power meters, to a master unit. The master unit may be, for example, a remote terminal unit (RTU) which may be located at a substation, such as a power plant supplying the power being measured. The RTU may query the individual meters for retrieving data from the respective meters. The RTU and/or meters may be located in environments in which electrical activity, including high voltage, current and/or power conditions, may generate electromagnetic fields and/or other conditions which typically cause detrimental noise along electrically conductive cable and/or may cause damage to respective hardware.

A certain degree of protection has been provided to devices along such a network by providing optical-electrical isolation to individual devices. However, the connections between the devices are still electrical and prone to noise, electrical transients, arcing, etc., particularly when in proximity to a high degree of electrical activity.

Propagation speed limitations may be overcome by using fiber-optic connections between devices. Furthermore, fiber-optic cables are not electrically conductive and are not susceptible to noise, poor grounding or power surge related problems. However, multiple data streams may result in catastrophic data collisions. A fiber-optic interface between a device and a fiber optic cable requires a dedicated input channel and a dedicated output channel in order to provide bi-directional communication.

Accordingly, it is an aspect of the present disclosure to provide a system and method for configuring a network of master/slave devices using a serial communication configuration which overcomes the limitations of a network using electrically conductive cables, and which overcomes the limitations of fiber optical cables in prior art serial communication configurations.

SUMMARY OF THE INVENTION

In accordance with the present disclosure, circuitry for connecting a device to a network having a series of electrical devices, such as electrical meters, is provided. The circuitry includes an input channel for receiving a light signal from an output channel of a preceding electrical device of the series of electrical devices; light to voltage converter (LVC) circuitry for receiving the light signal from the input channel and converting the light signal to a voltage signal and providing the voltage signal to a processor of the electrical device; voltage to light converter circuitry (VLC) for receiving the converted voltage signal and the output results from the processor and converting the received signal to a light signal; and an output channel for outputting the light signal from the VLC to a subsequent electrical device of the series of electrical devices.

In another embodiment of the disclosure, an electrical device is provided. The electrical device includes an input channel for receiving a light signal; LVC circuitry for receiving the light signal from the input channel and converting the light signal to a voltage signal; a processor for receiving the voltage signal, processing the voltage signal and outputting results of the processing; VLC circuitry for receiving the converted voltage signal and the output results from the processor and converting the received signal to a light signal; and an output channel for outputting the light signal from the VLC.

In still another embodiment of the disclosure, a network of serially connected electrical devices is provided. The network includes a series of electrical devices and fiber optic connectors between electrical devices of the series of electrical devices forming a closed communication ring in which output of respective electrical devices is communicatively connected to an input of a subsequent electrical device of the series of electrical devices.

In a further embodiment of the disclosure, an electrical device of a plurality of serially connected electrical devices is provided. The plurality of serially connected electrical devices form a closed communication ring in which an output of a respective electrical device of the plurality of serially connected electrical devices is communicatively connected to an input of a subsequent electrical device of the plurality of serially connected electrical devices. The electrical device includes a processor for receiving, processing and outputting signals; circuitry for receiving light signals from a preceding electrical device of the plurality of serially connected electrical devices, converting the received light signals into electrical signals and providing the electrical signals to the processor. The electrical device further includes circuitry for receiving electrical signals output from the processor, converting received electrical signals into light signals and providing the light signals to the subsequent electrical device of the plurality of serially connected electrical devices, wherein the light signals are propagated between electrical devices of the plurality of serially connected electrical devices primarily via fiber optic connectors.

In still another embodiment of the disclosure, a method is provided for communicating light signals between an electrical device and other electrical devices of a series of electrical devices. The method includes the steps of communicating with at least one electrical device of the series of electrical devices configured in a closed communication ring having a daisy chain configuration in which an output channel of respective electrical devices of the series of electrical devices is communicatively connected by a fiber optic connector to an input channel of a subsequent electrical device of the series of electrical devices; and receiving a light signal in an electrical device of the series of electrical devices from a preceding electrical device of the series of electrical devices; and processing the received light signal using digital processing circuitry.

BRIEF DESCRIPTION OF THE DRAWINGS

Various embodiments of the invention will be described herein below with reference to the figures wherein.

DETAILED DESCRIPTION OF THE PREFERRED EMBODIMENTS

Figure 1:
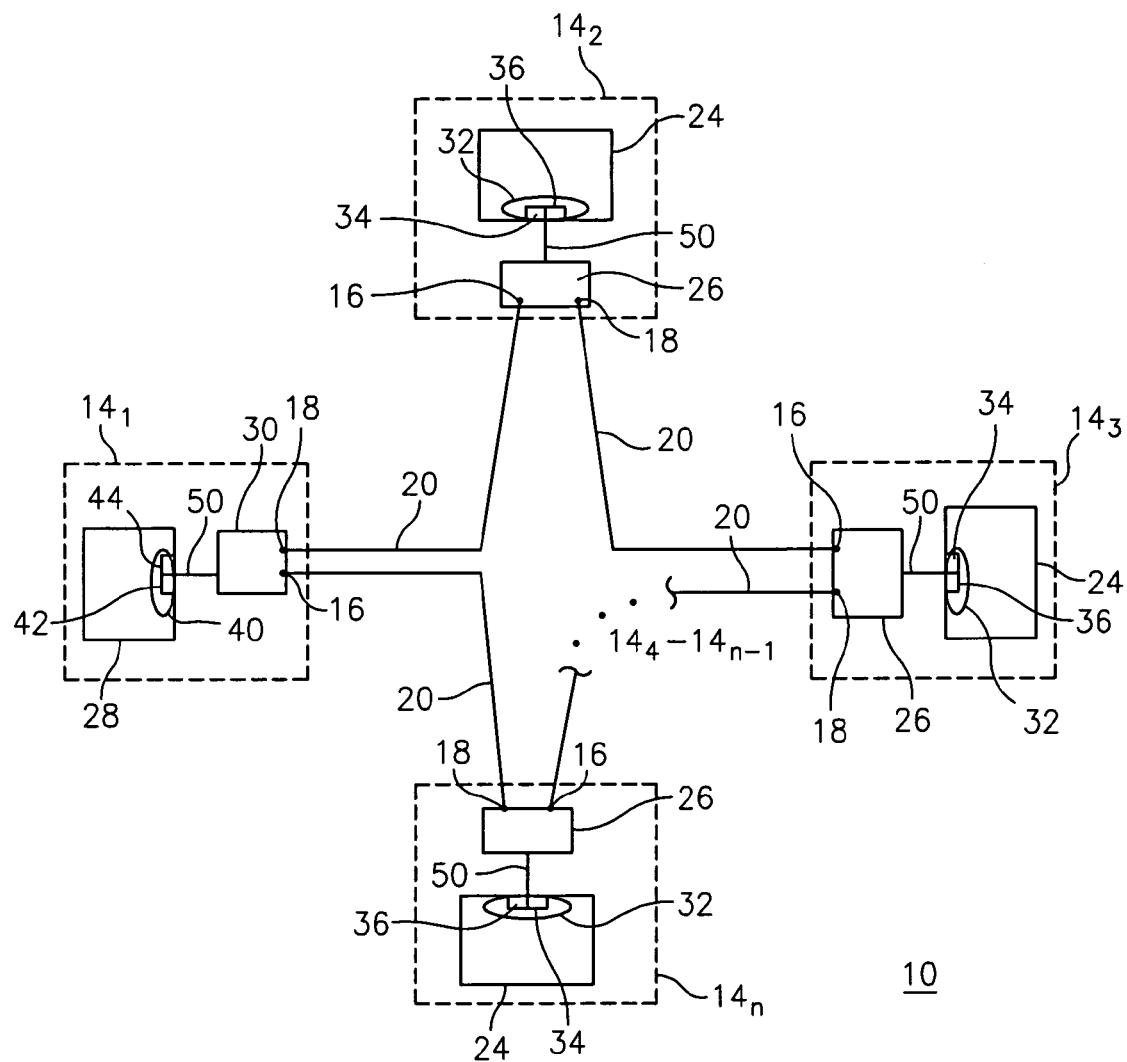
FIG. 1 is a schematic diagram of a network of master/slave electrical devices in a serial communication configuration in accordance with the present disclosure.

With respect to FIG. 1, a network of electrical devices 10 is shown. The network 10 includes electrical devices 14 communicatively connected in a series, where the series includes n devices $14_1$-$14_n$. One of the devices 14, shown as device $14_1$, is a master device, while the remaining devices $14_2$-$14_n$ are slave devices. The devices each have an input channel 16 and an output channel 18. The series of devices 14 are connected in series in a closed loop for forming a closed communication ring, in which the output channel 18 of respective devices 14 is communicatively connected to the input channel 16 of a subsequent device 14, in the series, which is preferably the next device 14 in the series. The output channel 18 of device $14_n$ is communicatively connected to the input channel 16 of the master device $14_1$.

Devices (preferably adjacent devices) in the series are communicatively connected via fiber optic connectors 20 for transmitting light signals between the connected devices 14.

The respective slave devices $14_2$-$14_n$ have a processor 24 and associated interface circuitry 26 for interfacing between the fiber optic connector 20 and the processor 24. The master device $14_1$ has a processor 28 and associated interface circuitry 30 for interfacing between the fiber optic connector 20 and the processor 28. The processor 24 has an input/output (I/O) channel 32 which may be conceptually described as including an input channel 34 and an output channel 36. The processor 28 has an input/output (I/O) channel 40 which may be conceptually described as including an input channel 42 and an output channel 44. A communication path 50 is provided between the I/O channel 32 and the interface circuitry 26 and between the I/O channel 40 and the interface circuitry 30. The communication path 50 for the respective devices 14 may be a communication path that is known in the art, such as an electronic conductor or a wireless connection.

The I/O 32 of processor 24 may include input and output channels 34 and 36 for receiving incoming data and transmitting outgoing data, respectively. The input and output channels 34 and 36 may share components, where the I/O 32 recognizes the direction of the data flow and dedicated and/or shared components of the appropriate channel 32 or 34 direct the data in the proper direction. Similarly for the I/O 40 of processor 28, where the input and output channels 42 and 44 may share components, and I/O 40 recognizes the direction of the data flow and dedicated and/or shared components of the appropriate channel 42 or 44 direct the data in the proper direction.

In the master/slave configuration shown, the master device $14_1$ sends a master message to a selected slave device $14_m$ (form within the range between 2 and n, inclusive). The master message has an associated address identifying the slave device $14_m$. Preferably, only the slave device $14_m$ which has an assigned address that corresponds to the address associated with the master message processes and/or responds to the non-address portion of the master message. Accordingly, the addressed slave device $14_m$ may send a reply message in response to the master message. The master reply messages all propagate in one direction about the communication ring. In order to avoid data collisions, the master device $14_1$ waits for an expected reply to arrive before sending a subsequent (or next) master message.

The slave and master devices 14 may include similar or identical components (e.g., processors and/or interfaces), or the components may be different. However, the master and slave devices 14 operate differently and must be configured to operate differently. It is contemplated that a device may be configured to operate in a first mode as a master device $14_1$ or in a second mode as a slave device $14_m$, such as by executing the appropriate software to operate as the master or slave, and/or by bypassing circuitry that should not be active during operation, in accordance with the mode selected. Such bypassing may be performed, for example, via hardwiring, selecting a switch position, software control, etc. The slave devices 14 may all be substantially identical, with each slave device $14_m$ having a preferably unique address assignment. It is further contemplated that the slave devices 14 may be different from one another, where the differences may be transparent to the master device $14_1$, or they may be known to the master device $14_1$ so that the master device may account for the differences by making adjustments to the master messages sent, the protocol used and/or the processing of the reply messages. It is typical for the slave devices $14_m$ to have relatively simple processing capabilities relative to the master device $14_1$.

In the present example, the slave devices $14_m$ are meters used for measuring an entity, such as electrical power usage. The meters are remote from one another, and are located at various locations for measuring power at their respective locations. The master device $14_1$ is a remote terminal unit (RTU) located remote from the meters, which may be located, for example at a power substation. The greatest distance between adjacent devices 14 is limited by the distance that the propagated signal can travel without attenuating to a level that cannot be processed. It is known to re-drive (or repeat) optical signals, thus virtually negating or minimizing any limitations. Advantageously, by providing communication between devices via fiber optic connectors, the light signals travel at the speed of light, thus minimizing latency during communications, even when signals propagate along relatively long distances. Furthermore, the fiber optical connectors are not susceptible to noise, interference, electromagnetic fields, etc., which may exist in the environs of the devices, particularly in the substation.

The master messages may be, for example, request messages for requesting data, control signals for controlling operation of the slave device $14_m$, update messages for updating a configuration of the slave device $14_m$, command messages for instructing the slave device $14_m$ to perform an operation or function, a status update request message for requesting information regarding the status of the slave device $14_m$, etc. The reply messages may be for example, data requested by the master device $14_1$, confirmation of receipt of master message, confirmation of performance of update or instructed command, etc.

The master device $14_1$ may perform processing of the received data, and/or send the data or processed data to another processor, such as a host processor. For example, the RTU may compile a consolidated report periodically (daily, weekly, etc.) of measurement data received from the meters, and send the reports to a processor located at an accounting department associated with the power company for billing customers for power usage.

The processors 24 and the processor 28 are configured to communicate using compatible protocols, where the protocol preferably includes embedded addressing and supports half duplex communication. Exemplary protocols with embedded addressing used in industrial applications, such as the power industry, that may be supported by network 10 include Modbus RTU, and Modbus TCP, DNP. The processor 24 and processor 28 each may include one or more processing devices, such as a microprocessor, a digital signal processor (DSP), analog devices, logic circuitry, and further may include and/or access one or more storage devices, such as ROM, SRAM, DRAM, flash memory, etc. The respective processors 24 of slave devices $14_m$ and the processor 28 of the master device $14_1$ may respectively execute one or more software modules including a series of programmable instructions which can be stored on a computer-readable storage medium, such as ROM, flash memory, RAM, a hard drive, CD-ROM, smart card, 3.5" diskette, etc., or transmitted via propagated signals for being executed by the respective processor 24 or 28 for performing the functions disclosed herein and to achieve a technical effect in accordance with the invention. The processors 24, 28 are not limited to execution of the software modules described. The functions of the respective software modules may be combined into one module or distributed among a different combination of modules.

Processor 24 of each slave device 14(m) executes a software module for processing the address associated with each received master message, including determining if the associated destination address (e.g., destination address embedded within the message) correlates to (e.g., matches) the address assigned to the processor 24. If the associated destination address and the assigned address correlate, the non-address portion of the master message is processed and requested or appropriate tasks are performed, which may include generating and outputting a reply message. If the associated destination address and the assigned address do not correlate, the master message is not addressed to or intended for the processor 24, and is not further processed by the processor 24. The master message propagates with low latency to each processor 24 of the slave devices 14(m) included in the communication ring. Only the processor 24 that is addressed processes the non-address portion of the master message and sends a reply message when appropriate.

Furthermore, the processor 24 may include a delay module, which may be a software module included or invoked by the software module executed by the processor 24, and/or may be a hardware implemented module. Execution and/or processing by the delay module causes a delay for a time period in proceeding with processing of the master message by the processor 24 and/or outputting of the corresponding reply message. The time period may be fixed or selectable. The time period may be selected and fixed at installation, or may be adjustable after installation, such as by way of user request via one or more user input devices on the slave device $14_m$ or a device providing control to the slave device $14_m$ (such as the master device $14_1$), automatic control, and/or software commands. For example, the master device $14_1$ may send a control master message to a slave device $14_m$ for adjusting the time period. The time period may be selected in accordance with a function of, for exampled, a length of the communication ring (e.g., a distance a master message travels (which is the distance around the entire communication ring), a distance that a master message propagates until reaching the slave device $14_m$, a distance that a reply message travels from the slave device $14_m$ to the master $14_1$, a distance between the slave device $14_m$ and an adjacent slave device ($14_{m+1}$ and/or $14_{m-1}$), and/or the number n of devices 14 in the communication ring.

The processor 24 receives signals (master messages) propagated along connector 20 and transmits signals (reply messages) to be propagated along connector 20 via interface 26. Similarly, processor 28 receives signals (reply messages) propagated along connector 20 and transmits signals (master messages) to be propagated along connector 20 via interface 30. The signals propagated along connector 20 are light signals, whereas the processors 24 and 28 are configured for receiving, processing and transmitting electrical signals. Accordingly, the interfaces 26 and 30 include circuitry for communicating bi-directionally with connector 20, converting between light and electrical signals and vice versa, processing the electrical signals for forming the signals to be compatible with the corresponding processor 24 or processor 28, and communicating bi-directionally with the corresponding processor 24 or processor 28.

Figure 2:
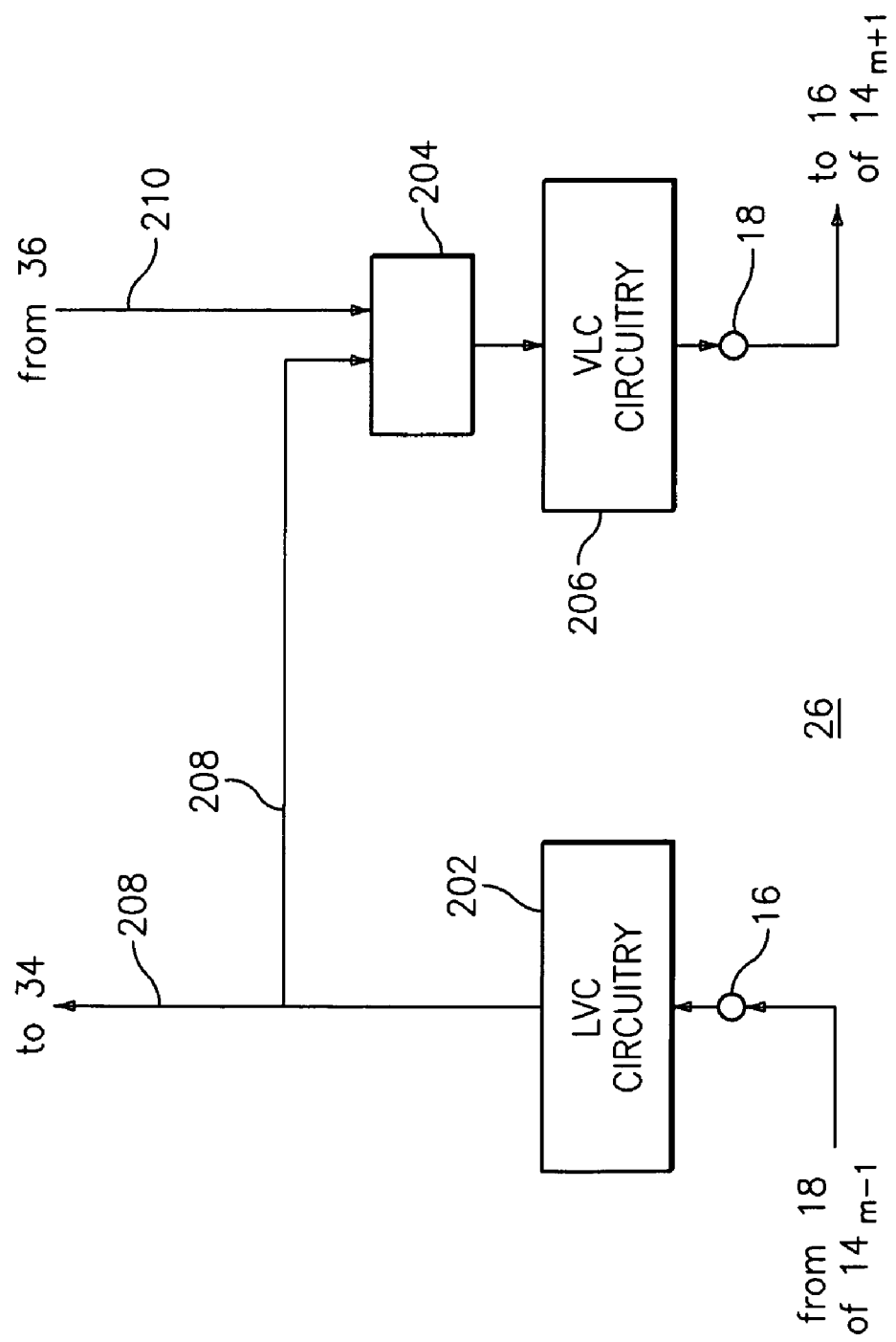
FIG. 2 is a block diagram of circuitry associated with slave devices of the network shown in FIG. 1.

With respect to FIG. 2, the interface 26 associated with a slave device $14_m$ is shown. The interface device 28 includes input channel 16, output channel 18, light to voltage converter (LVC) circuitry 202, and voltage to light converter (VLC) circuitry 206. At least a portion of the interface 26 may be provided on an integrated circuit (IC) chip. The input channel 16 receives light signals from connector 20, and directs the light signals to the LVC circuitry 202. The received light signals are signals which were output from the output channel 18 of the previous device $14_{m-1}$ (e.g., a preceding slave or master device). The LVC circuitry 202 includes circuitry that is known in the art for converting light to voltage and outputting an electrical signal having voltage levels readable by the processor 24 and the VLC circuitry 206 and/or circuitry associated therewith. The output from the LVC circuitry 202 is directed along a conductive path 208 which leads to the I/O 32 of the processor 24, and more specifically to the input channel 34 of the I/O 32.

Preferably, circuitry associated with the VLC circuitry 206 includes gate circuitry 204. The gate circuitry 204 includes circuitry that is known in the art for receiving first and second signals at first and second inputs A and B, respectively, and outputting one signal from an output C, where the signal output by the gate circuitry 204 corresponds to first signal when the first signal is received alone, and corresponds to the second signal when the second signal is received alone, without corrupting the first or second signals. Preferably, the gate circuitry 204 includes OR gate circuitry as known in the art for performing an OR operation on the inputs A and B and generating a result at output C. The output C is communicated to the VLC circuitry 206. The first input A of the gate circuitry 204 communicates with conductive path 208. The second input B of the gate circuitry 204 communicates with path 210, which communicates with the I/O 32 of the processor 24, and more specifically with the output channel 36 of the I/O 32.

Accordingly, the gate circuitry 204 receives signals transmitted by the previous device $14_{m-1}$ at the first input A, and signals output by the processor 24 at the second input B. Receipt of signals at input A and input B is staggered due to the processing time for processing the signals which were output from the processor 24 and provided to the input B of gate circuitry 204, whereas the signals at input A were not processed by processor 24. The processing time may further include the predetermined time period associated with the delay caused by the delay module. Accordingly, signals at inputs A and B are received one at a time and are provided without being corrupted to the VLC circuitry 206. The VLC circuitry 206 includes circuitry that is known in the art for converting voltage to light and outputting a light signal that corresponds to the received voltage signal. The light signal output by the VLC circuitry 206 is output from the slave device $14_m$ via the output channel 18, and then via the fiber optic connector 20 to the input channel 16 of a subsequent (preferably the next) slave device $14_{m+1}$.

The LVC circuitry 202 and/or the VLC circuitry 206, in addition to converting energy forms, may function to drive the light signal received at input channel 16. The VLC circuitry 206 may be a repeater or a driver, as known in the art. Light signals received at the LVC circuitry 202 may have attenuated while propagating from the previous device $14_{m-1}$ to the slave device $14_m$. Although attenuated, the LVC circuitry 202 senses received light signals and converts them to a "high" voltage, where the "high" voltage is a predetermined voltage which is readable by the processor 24 and the gate circuitry 204. The "high" voltage does not vary in accordance with strength of the light signal. Accordingly, even an attenuated light signal will be processed as a full strength signal, and the attenuation will not affect the strength of associated signals that will be output from the output channel 18 in response to receipt of the light signal.

The degree of attenuation associated with the received light signal may be a function of conditions such as the distance between the previous station 14 and the slave station $14_m$. The strength of the received light signal further is a function of the original strength of the signal as it was generated by the VLC circuitry 206 of the previous device. Furthermore, the sensitivity of the LVC circuitry 202 for sensing light signals determines its ability to recognize attenuated light signals. Accordingly, the sensitivity of the LVC circuitry 202 for the slave device $14_m$ may be selected in accordance with at least one of the distance between the slave device $14_m$ and the previous device $14_{m-1}$ and the intensity of the light signal upon generation thereof by the VLC circuitry 206 of the previous device $14_{m-1}$.

The VLC 206 receives "high" and "low" voltage signals for binary or digital communication and converts the "high" voltage signals into a light signal, where the light signal has a predetermined intensity. The intensity of the light signal generated by the VLC circuitry 206 may be selected in accordance with at least one of the distance between the slave device $14_m$ and the subsequent device 14, and the sensitivity of the LVC circuitry 202 of the subsequent device 14. Due to the ability to generate or drive the outgoing light signal at a predetermined intensity, the number of devices included in the network 10 is virtually unlimited, provided that light signals propagated between adjacent pairs of devices 14 are readable by the receiving device 14.

Readability of light signals may be insured by adjusting the sensitivity of the LVC circuitry 202, the amplification of light intensity output by the VLC 206 and/or limiting the allowable distance between adjacent devices 14. The sensitivity of the LVC circuitry 202 and the intensity of light signals generated by the VLC 206 may be adjustable, where the adjustment may be manual or automatic. Automatic adjustment may be in accordance with manually input data, sensed data (e.g., signal strength and/or average signal strength) and/or data received from another device 14.

Figure 3:
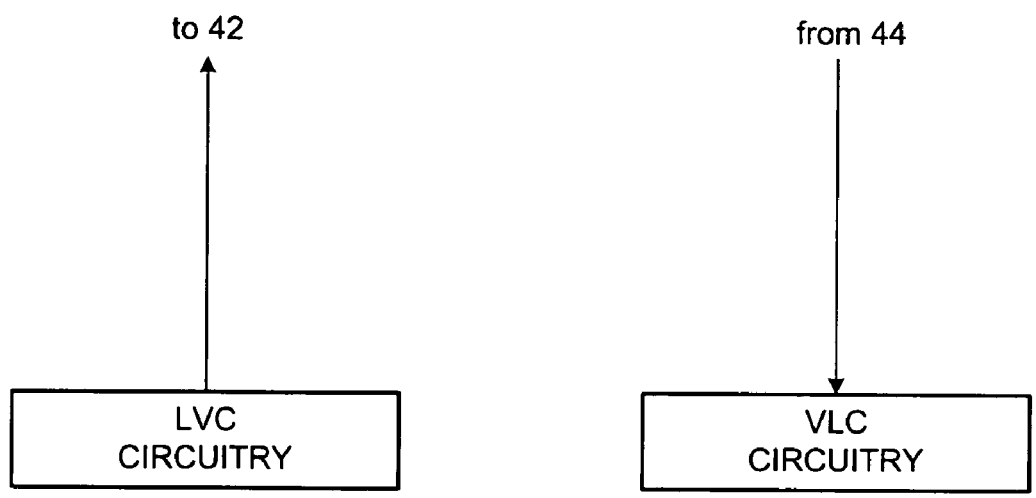
FIG. 3 is a block diagram of circuitry associated with the master device of the network shown in FIG. 1.

With respect to FIG. 3, the interface 30 associated with the master device $14_1$ is shown. The interface device 30 includes input channel 16, output channel 18, LVC circuitry 202, and VLC circuitry 206. At least a portion of the interface 30 may be provided on an integrated circuit (IC) chip. The input channel 16 receives light signals from connector 20, and directs the light signals to the LVC circuitry 202. The received light signals were output from the output channel 18 of the previous slave device $14_n$. The LVC circuitry 202 provides the functions and benefits discussed above with respect to the slave devices $14_m$. The LVC circuitry 202 receives the light signals from the input channel 16 of the master device $14_1$ and converts the light signals into voltage signals which are directed along a conductive path 308 which leads to the I/O 40 of the processor 28, and more specifically to the input channel 42 of the I/O 40.

Data output by the processor 28 via the output channel 44 of the I/O 40, which is in the form of voltage signal, is communicated to the VLC circuitry 206. The VLC circuitry 206 provides the functions and benefits discussed above with respect to the slave device $14_m$. The VLC circuitry 206 outputs a light signal that corresponds to the voltage signals output by the processor 28 which is output by the master device $14_1$ via the output channel 18, and then via the fiber optic connector 20 to the input channel 16 of the subsequent slave device $14_1$.

In operation, a master message having an associated address that corresponds to a slave device $14_m$ is generated by the master device $14_1$. The master message is output through output channel 18 of the master device $14_1$ and propagated along the fiber optic connector 20 to the subsequent device, which is slave device $14_2$. The master message is received at input channel 16 of slave device $14_2$ where it is converted to a voltage signal by LVC circuitry 202 and communicated to the gate circuitry 204 through which it passes without being altered, and is then converted back to a full strength light signal by VLC circuitry 206 and output via channel 18 of the slave device $14_2$ and sent to the subsequent slave device $14_3$. The master message thus circulates quickly through the communication ring (until it returns to the master device $14_1$) without being delayed by processing delays associated with of the processors 24 of the slave devices $14_m$.

In slave device $14_2$, at substantially the same time that the master message passes through the gate circuitry 204, the master message is provided to the processor 24 of slave device $14_2$ via the processor's I/O 26. If the associated address of the master message does not correlate to (e.g., match) the address assigned to the slave device $14_2$, the processor 24 does not respond to the master message and does not generate any output. If the associated address of the master message does correlate to (e.g., match) the address assigned to the slave device $14_2$, the processor 24 processes at least another portion of the message, which is a non-address portion of the message.

The slave device $14_2$ responds to the master message by performing any instructions in the message, which may include replying to the master message with a reply message. The reply message may include a data report. For example, when the slave device $14_2$ is a power meter, the data report may include a report of power measured by the meter. The reply message may include a confirmation that the master message was received and/or results of the requested action (e.g., update software in the slave device, change a software parameter, etc.). Furthermore, the processing of the non-address portion of the message may include processing the delay module for creating a delay of a predetermined time period, which may be performed in software and/or hardware.

The reply is output by the processor's I/O 32, passes through the gate circuitry 204 without being altered, and is then converted back to a full strength light signal by VLC circuitry 206 and output via channel 18 of the slave device $14_2$ and sent to the subsequent slave device $14_3$. The reply signal will circulate quickly through the remainder of the communication ring, similarly to the circulation of the master message. Slave devices $14_m$ only process the non-address portion of the message when the associated address of an address correlates to their own assigned address. Accordingly, assuming that the destination for the reply message is the master device $14_1$, no slave devices $14_m$ will process the non-address portion of the reply message.

The processing of the non-address portion of the master message occurs as the master message continues to circulate through the remainder of the communication ring. The reply message is output from the output channel 18 after the master message passes through the output message. The delay between the output of the master message and the reply message depends on the degree of processing entailed in processing the non-address portion of the master message, including the length of the predetermined time period when the delay module is processed. Even when the delay module is not processed the reply message is output from output channel 18 of slave device $14_2$ after the master message.

If the slave device $14_2$ was not addressed by the address associated with the master message, the master message continues to circulate through the communication ring, and the slave device $14_m$ that has an assigned address that correlates to the address associated with the master message will process the non-address portion of the master message.

Accordingly, the master message and the reply message are staggered for preventing data collisions. The master device $14_1$ operates in a half duplex mode, and waits for completion of circulation of the master message and/or receipt of the expected replay message and/or a time/out condition (lapse of a predetermined period of time indicating a communication failure) before sending another master message. Operation in the half duplex mode minimizes the possibility of a data collision.

It is contemplated that the master device $14_1$ may send a message which is destined for more than one slave device $14_m$. Such a master message may include multiple addresses, no address (indicating that it is for any slave device $14_m$), a master address for all of the slave devices $14_m$, or a group address for addressing a group of slave devices $14_m$ Proper staggering of reply messages sent by the various slave devices $14_m$ for avoiding data collisions may be provided by setting and/or adjusting the time period associated with the delay module of the respective slave devices $14_m$. The master device $14_1$ may knows how many reply messages are expect or the time period within which all reply messages should arrive, and wait accordingly before sending out a subsequent (or next) master message.

The device 14 may be designed and/or manufactured to process light signals which propagate between devices along fiber optic connectors 20. The interface 26 may be integrated with the processor 24, e.g., housed within the same housing, and/or the interface 30, similarly, may be integrated with the processor 28. It is contemplated that the device 14 may have originally been designed, manufactured and/or used to process electrical signals which propagate between devices 14 via electrically conductive connectors, and that interfaces 26 and 30 are provided for modifying the devices 14 for allowing the devices 14 to process light signals propagated between devices along fiber optic connectors 20.

The processor 24 and the interface 26 may have different housings, and likewise the processor 28 and the interface 30 may have different housings. The modified device 14 may include a housing for housing the processor 24 and the interface 26 together or for housing the processor 28 and the interface 30 together. It is further contemplated that, a modular connection be provided for removably or permanently connecting the interface 26 to the processor 24 for converting the device 14 into a device that is capable of processing light signals transmitted between devices. Similarly, a modular connection may be provided for removably connecting the interface 30 to the processor 28 for converting the device $14_1$ into a master device that is capable of processing light signals transmitted between devices.

Figure 4:
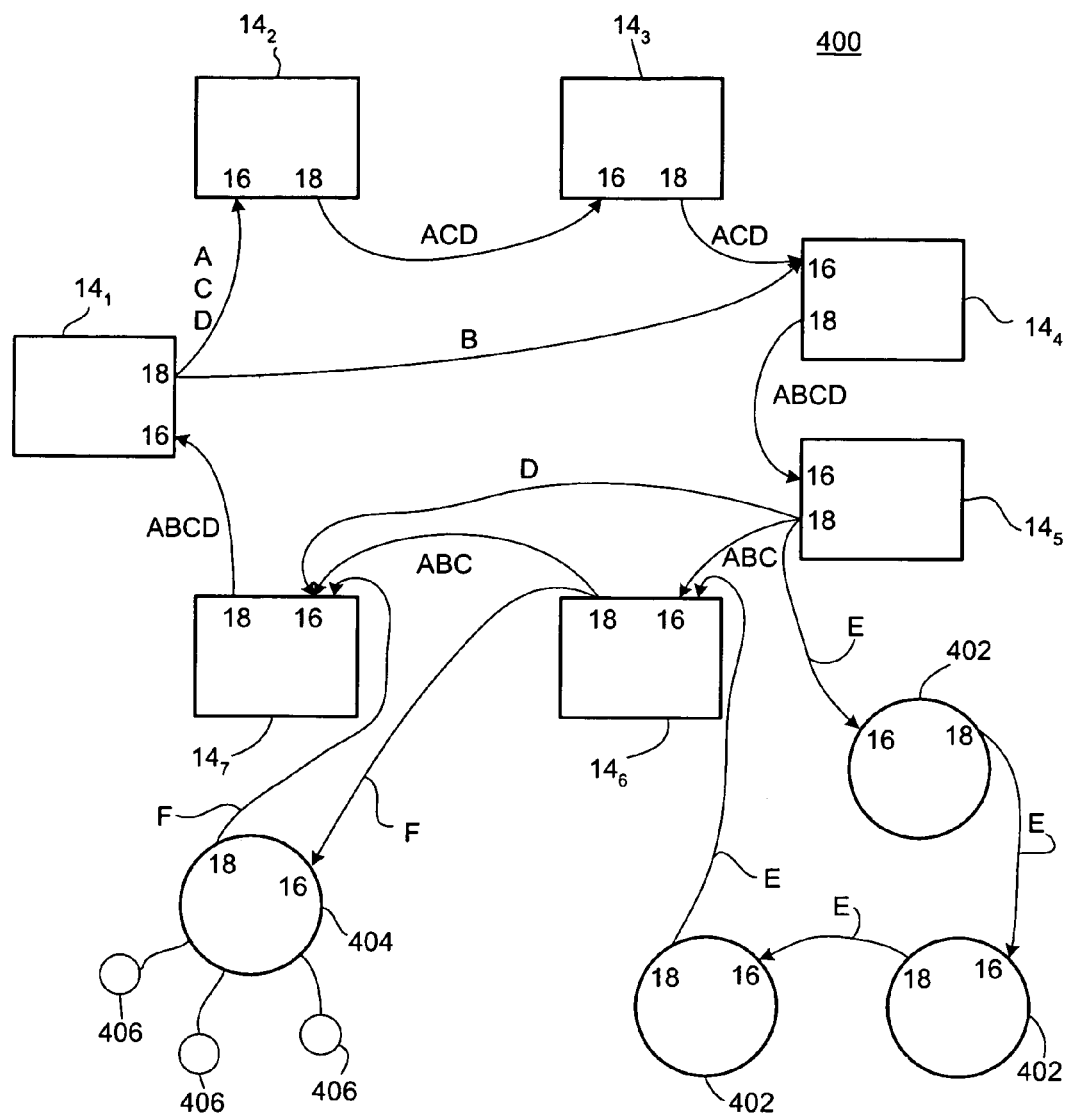
FIG. 4 is a schematic diagram of the network of electrical devices in accordance with another embodiment of the present disclosure.

With respect to FIG. 4, a network 400 is shown in which more than one communication ring is provided. As shown, the input channel 16 and/or output channel 18 of an electrical device 14 of the network may be connected to more than one other electrical devices 14. The respective communication rings may use all of the electrical devices 14, or a sub-group of the electrical devices 14. The sub-groups may be mutually exclusive, or may overlap so that one or more electrical devices 14 belong to more than one sub-group. It is further contemplated that the network 400 may include more than one master device; however, it is preferable that only one device 14 act as a master device at any point in time.

In the example shown in FIG. 4, devices $14_1$ and $14_5$ may operate in a master mode or a slave mode, with only one of devices $14_1$ or $14_5$ operating in a master mode at any point in time to avoid data collisions. Furthermore, communication rings A, B, C and D are shown. In communication rings A and B, device $14_1$ is in master mode and device $14_5$ is in slave mode In communication rings C and D, device $14_5$ is in master mode and device $14_1$ is in slave mode.

In communication ring A, a master message is transmitted from device $14_1$ to device $14_2$ and the message circulates through the communication ring A (to devices $14_3$, $14_4$, $14_5$, $14_6$ and $14_7$) until it returns to the master device $14_1$. In communication ring B, a master message is transmitted from device $14_1$ to device $14_4$ and the message circulates through the communication ring B (to devices $14_5$, $14_6$ and $14_7$) until it returns to the master device $14_1$. In communication ring C, a master message is transmitted from device $14_5$ to device $14_6$ and the message circulates through the communication ring C (to devices $14_7$, $14_1$, $14_2$, $14_3$, $14_4$,)) until it returns to the master device $14_5$. In communication ring D, a master message is transmitted from device $14_5$ to device $14_7$ and the message circulates through the communication ring D (to devices $14_1$, $14_2$, $14_3$, $14_4$,) until it returns to the master device $14_5$.

As shown, when operating in a master mode, devices $14_1$ and $14_5$ transmit messages to a device in accordance with the communication ring selected, and when operating in a slave mode transmit messages to a subsequent device in the communication ring being used. The communication ring may be selected by an outside device, such as a host processor in communication with one or more of the master device, or by the current master device. Instructions to devices $14_1$ or $14_5$ to change mode from slave to master, or vice versa, may be received by an outside device such as the host processor, or from the acting master device via a master message.

It is further envisioned that a group of at least one electrical device 402 and/or a group of devices 404 and 406 be added to the network 400. The communicative connection between output channel 18 of device $14_5$ and the input channel of device $14_6$ may be disabled, or device $14_5$ may operate in a master mode and select to transmit the message to one of the devices 402. Paths F provide for communicatively connecting each of the devices 402 to the network 400. The devices 402 may use the same communication protocol as devices $14_m$, or another communication protocol, such as by using conventional RS45 hardware and protocols, where an interface (e.g., interface circuitry and/or software) is provided to interface the devices 402 to the devices $14_m$. The interface may be provided, for example as integrated with one or more devices 402 and/or device $14_5$ and/or device $14_6$.

The devices 404 and 406 are shown in a non-serial configuration. It is contemplated that sub-groups having other non-serial configurations may be added and/or included in the network 400 as well. The communicative connection between output channel 18 of device $14_6$ and the input channel of device $14_7$ may be disabled, or device $14_6$ may be configured to operate in a master mode and select to transmit the message to one of the devices 404 or 406. Paths G are provided for communicatively connecting the group of devices 404 and 406 to the network 400. Internal paths are provided between device 404 and devices 406. Device 404 may comply with the protocol of the network 400 for receiving a message from device $14_6$ and providing the message to device $14_7$, or an interface may be provided (e.g., interface circuitry and/or software) to interface the devices 404 to the devices $14_m$. The interface may be provided, for example as integrated with device 404 and/or device $14_6$ and/or device $14_7$. Accordingly, additional devices $14_m$ and/or networks of devices may be added to the closed communication ring 400.

The described embodiments of the present invention are intended to be illustrative rather than restrictive, and are not intended to represent every embodiment of the present invention. Various modifications and variations can be made without departing from the spirit or scope of the invention as set forth in the following claims both literally and in equivalents recognized in law.

The invention claimed is:

1. An electrical metering device for measuring an amount of electrical power usage of a power distribution system comprising:

an input channel for receiving a light signal;

light to voltage converter (LVC) circuitry for receiving the light signal from the input channel and converting the light signal to a first voltage signal;

a processor for receiving the first voltage signal, processing the first voltage signal and outputting results of the processing as a second voltage signal wherein said processor is configured to determine the amount of electrical power usage measured by the electrical metering device;

gate circuitry having a first input for receiving the first voltage signal from the LVC circuitry, a second input for receiving the second voltage signal including the output results from the processor, and circuitry for generating an output signal corresponding to a signal received at one of the first and second inputs, wherein receipt of the first and second voltage signals are staggered for preventing data collisions;

voltage to light converter (VLC) circuitry for receiving the output signal from the gate circuitry and converting the received signal to a light signal; and an output channel for outputting the light signal from the VLC circuitry.

2. The device according to claim 1, wherein the received light signal and the output light signal are propagated along fiber-optic connectors.

3. The device according to claim 1, wherein: the received light signal has an associated address; and the processor processes content of a non-address portion of the received first voltage signal depending on if the associated address included in the signal correlates to an address assigned to the device.

4. The device according to claim 3, wherein the processor comprises a delay module for generating a delay for a predetermined time period in association with processing the non-address portion of the received first voltage signal.

5. The device according to claim 4, wherein the time period is adjustable.

6. The device according to claim 5, wherein: the electrical device is included in a network having a series of electrical devices; and adjustment of the time period is in accordance with a function of at least one of a distance a received light signal is propagated from the origin of the message within the series of electrical devices to the electrical device, the number of electrical devices included in the series of electrical devices, and the distance a light signal transmitted by the electrical device is propagated from the electrical device to a final destination within the series of electrical devices.

7. The device according to claim 1, wherein: the processor includes input/output (I/O) circuitry; and the input channel, the output channel, the LVC circuitry, the VLC circuitry and associated circuitry are packaged for installation with the processor for communicating with the processor via the I/O circuitry of the processor.

8. The device according to claim 7, wherein the packaging is in the form of an IC chip.

9. The device according to claim 1, wherein the electrical device is included in a network having a series of electrical devices, including a plurality of slave devices and a master device.

10. Circuitry for connecting an electrical device to a closed communication network of connected electrical devices, the circuitry comprising:

an input channel for receiving a light signal from an output channel of a preceding electrical device of the series of electrical devices;

light to voltage converter (LVC) circuitry for receiving the light signal from the input channel and converting the light signal to a first voltage signal and providing the first voltage signal to a processor of the electrical device;

gate circuitry having a first input for receiving the first voltage signal from the LVC circuitry, a second input for receiving a second voltage signal including output results from the processor, and circuitry for performing a logical OR operation on signals received at the first and second inputs and generating an output signal which is provided to the VLC circuitry, wherein receipt of the first and second voltage signals are staggered for preventing data collisions;

voltage to light converter (VLC) circuitry for receiving the output signal from the gate circuitry and converting the received signal to a light signal; and an output channel outputting the light signal from the VLC circuitry to a subsequent electrical device of the series of electrical devices.

11. The circuitry according to claim 10, wherein the circuitry is packaged as an IC chip.

12. The circuitry according to claim 10, wherein the electrical device is configured for propagating electrical signals along a conductive path between the electrical device and another electrical device of the series of electrical devices, and installation of the circuitry with the electrical device allows for propagation of light signals along fiber optic connectors between the electrical device and the other electrical device.

13. The circuitry according to claim 10, wherein at least one of sensitivity of the LVC circuitry for sensing the received light signal and amplification by the VLC circuitry of the output light signal is adjustable.

14. A network of serially connected electrical devices comprising:

a series of electrical devices, wherein respective electrical devices of the series of electrical devices comprise: an input channel for receiving a light signal from an output channel of a preceding electrical device of the series of electrical devices; light to voltage converter (LVC) circuitry for receiving the light signal from the input channel and converting the light signal to a voltage signal; a processor for receiving the voltage signal, processing the voltage signal and outputting results of the processing wherein said processor is configured to determine the amount of electrical power usage measured by the respective electrical device; gate circuitry having a first input for receiving the voltage signal from the LVC circuitry, a second input for receiving the output results from the processor, and circuitry for generating an output signal corresponding to a signal received at one of the first and second inputs, wherein receipt of the signals at the first and second inputs are staggered for preventing data collisions; voltage to light converter (VLC) circuitry for receiving the output signal from the gate circuitry and converting the received signal to a light signal; and an output channel for outputting the light signal from the VLC circuitry to a subsequent electrical device of the series of electrical devices; and fiber optic connectors between electrical devices of the series of electrical devices for forming a closed communication ring in which an output of respective electrical devices is communicatively connected to an input of a subsequent electrical device of the series of electrical devices.

15. The network according to claim 14, wherein the series of electrical devices includes a plurality of slave devices and a master device.

16. The network according to claim 14, wherein the network operates using a serial protocol which is half duplex.

17. The network according to claim 15, wherein: a protocol used by the network is addressable; respective signals generated by the master device are associated with an address assigned to an individual slave device of the plurality of slave devices; and respective slave devices comprise a processor for processing non-address content of the signal depending on if the address associated with the signal correlates to the address assigned to the respective slave device.

18. The network according to claim 14, wherein the processor comprises a delay module for generating a delay for a predetermined time period in association with processing the non-address portion of the received voltage signal.

19. The network according to claim 18, wherein the time period is adjustable.

20. The network according to claim 18, wherein: processing the non-address content of the signal includes generating and outputting a reply signal; and the time period for different slave devices of the plurality of slave devices is different for staggering the reply signals from different slave devices.

21. The network according to claim 14, wherein the network comprises a first and second series of electrical devices, and fiber optic connectors between electrical devices of each of the first and second series for forming first and second communication rings in which an output of respective electrical devices is communicatively connected to an input of a subsequent electrical device of the corresponding series of first and second series.

22. The network according to claim 21, wherein the communication ring to be used for communication within the network is selectable.

23. An electrical metering device of a plurality of serially connected electrical metering devices, wherein the plurality of serially connected electrical devices form a closed communication ring in which an output of a respective electrical device of the plurality of serially connected electrical devices is communicatively connected to an input of a subsequent electrical device of the plurality of serially connected electrical devices, the electrical metering device comprising:

a processor for receiving, processing and outputting signals;

circuitry for receiving light signals from a preceding electrical device of the plurality of serially connected electrical devices, converting the received light signals into electrical signals and providing the electrical signals to the processor wherein said processor is configured to determine the amount of electrical power usage measured by the electrical metering device;

gate circuitry having a first input for receiving the converted electrical signals directly from the circuitry for receiving light signals, a second input for receiving electrical signals output by the processor, and circuitry for generating an output signal corresponding to a signal received at one of the first and second inputs, wherein receipt of the signals at the first and second inputs are staggered for preventing data collisions; and circuitry for receiving the output signal from the gate circuitry, converting received output signal into light signals and providing the light signals to the subsequent electrical device of the plurality of serially connected electrical devices; wherein the light signals are propagated between electrical devices of the plurality of serially connected electrical devices primarily via fiber optic connectors.

24. The device according to claim 23, wherein the plurality of serially connected devices includes a master device and a plurality of slave devices, and wherein the device is a master device.

25. The device according to claim 24, wherein the processor of the master device is configured for generating a master message to be sent in an outgoing signal that is addressed for at least one slave device of the plurality of slave devices.

26. The device according to claim 25, wherein the processor of the master device is configured for waiting for response to a master message before sending a subsequent master message.

27. The device according to claim 23, wherein the plurality of serially connected devices includes a master device and a plurality of slave devices, and wherein the device is a slave device.

28. The device according to claim 27, wherein: the protocol is addressable; respective signals generated by the master device are associated with an address assigned to an individual slave device of the plurality of slave devices; and the processor processes non-address content of the signal depending on if the address associated with the signal correlates to the address assigned to the slave device.

29. The device according to claim 28, wherein the processor comprises a delay module for generating a delay for a predetermined time period in association with processing the non-address portion of the received electrical signal.

30. The device according to claim 23, wherein the plurality of serially connected devices includes a master device and a plurality of slave devices, and wherein the device selectably operates in a first mode as the master device or in a second mode as a slave device of the plurality of slave devices.

31. A method of communicating light signals between an electrical metering device and other electrical metering devices of a series of electrical metering devices comprising the steps of:

communicating with at least one electrical metering device of the series of electrical metering devices configured in a closed communication ring in which an output channel of respective electrical metering devices of the series of electrical metering devices is communicatively connected by a fiber optic connector to an input channel of a subsequent electrical metering device of the series of electrical metering devices;

receiving a light signal in an electrical metering device of the series of electrical metering devices from a preceding electrical metering device of the series of electrical metering devices;

converting the received light signal to an electrical signal;

processing the converted electrical signal;

performing a logic OR operation on the converted electrical signal and the processed converted electrical signal, wherein receipt of the converted electrical signal and processed converted electrical signal are staggered due to the processing of the converted electrical signal for preventing data collisions;

converting at least a signal including results of the logic OR operation into a light signal; and transmitting the converted light signal to a subsequent electrical metering device of the series of electrical devices.

32. The method according to claim 31, wherein the processing step is performed depending on if an address associated with the received light signal correlates to an address assigned to the electrical device, and further comprises the step of waiting for a predetermined time period.

33. The method according to claim 32, further comprising the step of adjusting the predetermined time period.

* * * * *